March 23, 1971 R. E. MINOR ET AL 3,572,257
APPARATUS FOR EXTRUSION OF ICE CREAM
Filed Nov. 13, 1968 2 Sheets-Sheet 1

INVENTORS
RONALD E. MINOR
SIDNEY B. McMILLION

BY *Browne, Schuyler & Beveridge*

ATTORNEYS

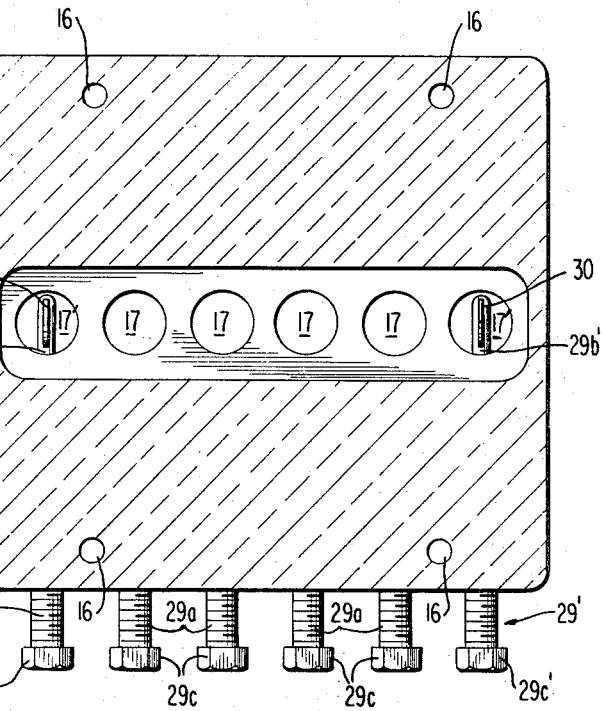
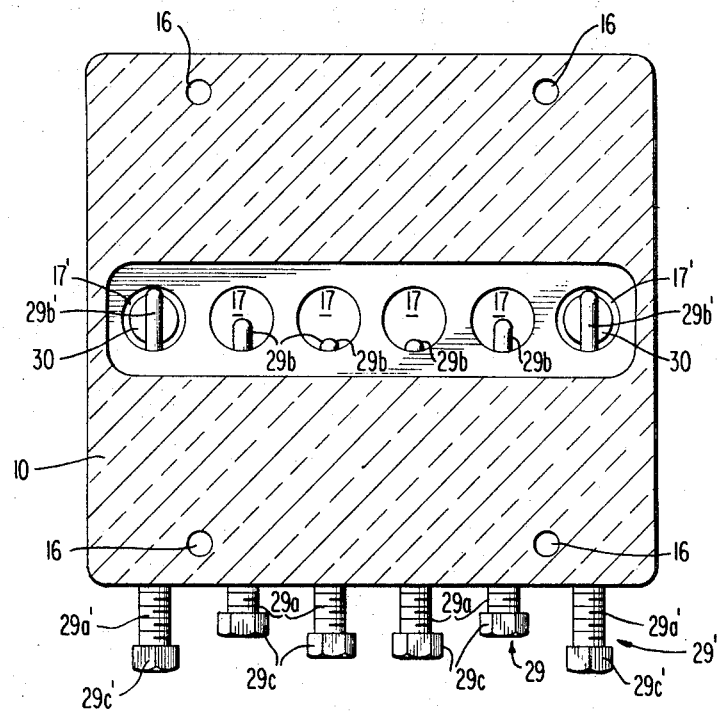

United States Patent Office 3,572,257
Patented Mar. 23, 1971

3,572,257
APPARATUS FOR EXTRUSION OF ICE CREAM
Ronald E. Minor and Sidney B. McMillion, Richmond, Va., assignors to Eskimo Pie Corporation, Richmond, Va.
Filed Nov. 13, 1968, Ser. No. 775,340
Int. Cl. A21c 11/16
U.S. Cl. 107—14                                    10 Claims

ABSTRACT OF THE DISCLOSURE

An apparatus for manufacturing in quantity, pellets of ice cream and other frozen dessert confections of uniform size by continuously extruding lengths of the dessert in the form of a congealable mass from a plurality of orifices in a single extruder head and periodically severing the extruded lengths to form the individual pellets, each orifice being provided with means for adjusting the rate of flow of the congealable mass from the orifice.

BACKGROUND OF THE INVENTION

This invention relates to an improved apparatus for manufacturing congealable products such as ice cream and other frozen confections. More particularly, this invention relates to the production of pelletized ice cream or the like by extrusion of a congealable mass through a plurality of orifices, each of which is provided with means for adjusting the rate of flow whereby pellets of uniform configuration may be made by slicing the material after extrusion.

Ice cream and similar confections studded with particles such as chocolate drops, fruit particles, etc., are known. It has been suggested that a novel dessert can be made by imbedding small coated pellets of various flavored ice cream or frozen confection in a large mass of ice cream or frozen desesrt, such as imbedding chocolate coated pellets of strawberry, mint, and various fruit flavored ice cream in a mass of vanilla ice cream. Various techniques can be used in the manufacture of the pelletized confections which are imbedded in other kinds of ice creams. Such pelletized products can be produced in a mold, or by extrusion, or by other conventional manufacturing methods. Their manufacture, however, ordinarily involves the reduction of a comparatively large volume of ice cream into numerous comparatively small pellets. The conventional manufacturing methods heretofore employed are markedly inefficient, as will be explained below, particularly with respect to lack of uniformity of configuration of the respective pellets.

An object of the present invention is to provide an efficient method and apparatus for producing large quantities of pellets of ice cream and other frozen confections.

Another object of the present invention is to provide a method and apparatus for producing pelletized congealed products of uniform configuration.

Still another object of the present invention is to provide a method and apparatus for producing pellets of ice cream and other frozen confections by continuous extrusion.

SUMMARY OF THE INVENTION

The above objects are achieved by the use of an extruder head containing a manifold cavity in one face of the extruder head, and a plurality of orifices or extrusion passages of uniform cross-sectional configuration formed in the extruder head through which the frozen dessert mix passes from the manifold cavity to the exterior of the extruder head. The frozen dessert mix is piped from the source under pressure to the extruder head manifold cavity by conventional means. The mass of mix is then extruded continuously in a smooth flow through all of the extrusion passages in parallel, as distinguished from conventional extrusion through a single orifice in the extruder head.

Each extrusion passage contains an independent and adjustable restrictor or throttle mounted in the extruder head. The throttle is positioned in the extruder head so as to be operably movable to restrict the cross-sectional area of the extrusion passage to a determinable amount. At least one throttle is positioned so as to be capable of being extended transversely of an extrusion passage, each throttle being controllable from outside the extruder head to adjust the rate of flow within each extrusion passage.

Some turbulence occurs in the flow around the throttles extending into the extrusion passages. The location of the position of the respective throttles in the respective extrusion passages should be such that the turbulence takes place far enough from the respective extrusion passage outlets that smooth flow of the soft or partially congealed mass will be re-established before the mass reaches the extrusion passage outlets.

The extruder head is intended for installation in an ice cream extruding machine of the type disclosed in U.S. Pat. 2,739,545 in which the severing elements are passed across the face of the extruder head, adjacent the extrusion passage outlets, slicing the extruded partially congealed lengths of dessert into a plurality of uniform pellets in a single cutting stroke as the mass is extruded in parallel streams from the plurality of extrusion passages in the extruder head, the sliced pellets falling onto trays for conveyance through the freezing chambers. The cutting operation is repeated at regular intervals to produce pellets of uniform length in quantity and in rapid, efficient succession.

The throttles used in the various extrusion passages may be of any of a variety of configurations. For example, an axially translated screw-driven throttle device may be used, or a sliding vane throttle may be used. Even butterfly or flapper type valves may be used. Under certain conditions it may be that various combinations of these throttling devices will produce results which are superior to those obtained by using only one type of throttle.

After the mass is sliced into pellet form from the congealed or partially congealed prism of the mass, the pellets are removed from the cutting area by suitable conveyor means. The pellets are conveyed to a point where they may be imbedded in an ice cream matrix, either with or without having enrobed the pellets in an encapsulating confection such as chocolate. The pellet-studded ice cream product is then packaged for distribution.

Other further objects and features of the invention will become apparent from the following detailed description of a preferred embodiment thereof wherein reference is made to the accompanying drawings, in which:

FIG. 3 is a sectional view taken along line 3—3 of FIG. 2.

FIG. 4 is the same view as in FIG. 3, but with the six throttles in various stages of closure.

DESCRIPTION OF PREFERRED EMBODIMENTS

Figure 1:
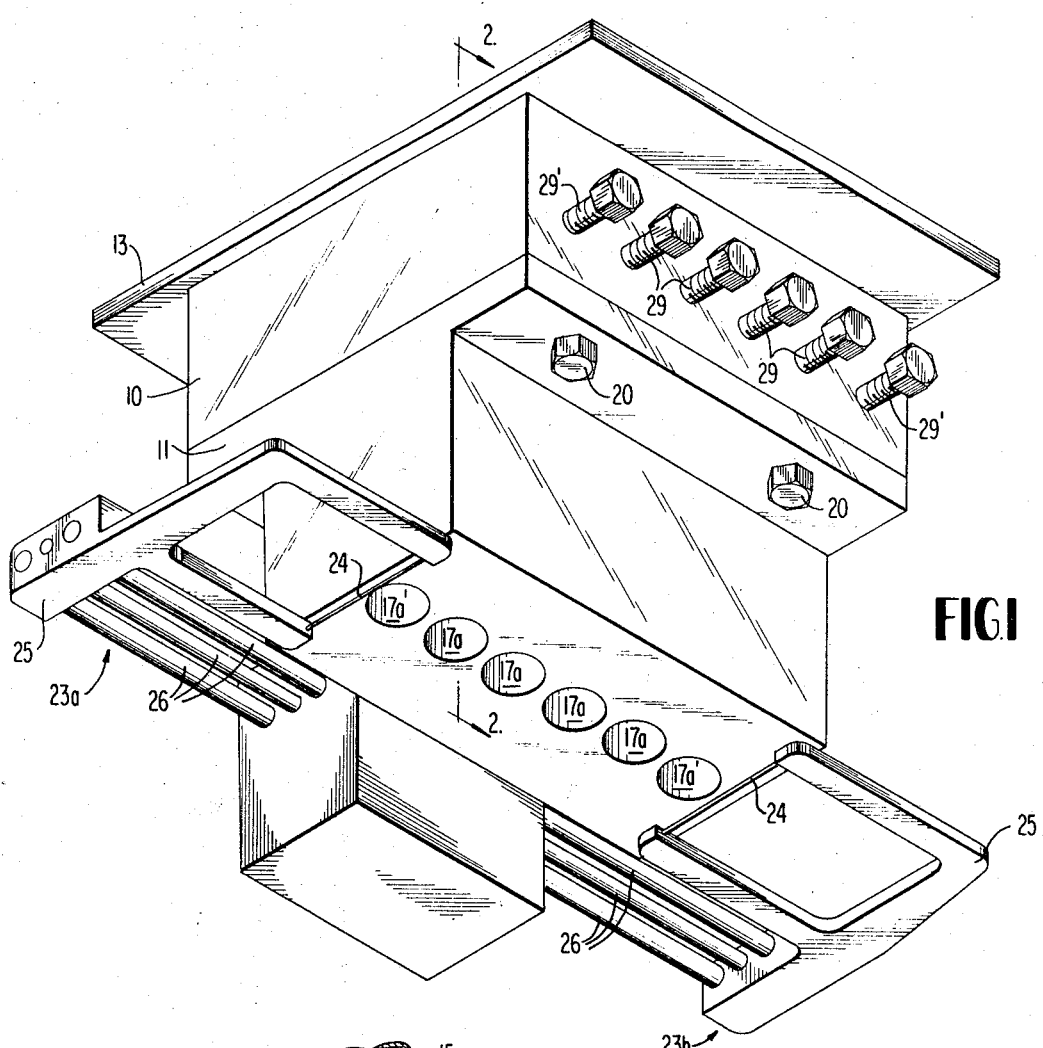
FIG. 1 is a perspective view of the exterior of an extruder head in relationship to the cutting arms of the extruding apparatus (not shown) on which the head is installed.

The extruder head of this invention utilizes two blocks of plastic material which are bolted together, an upper block 10 and a lower block 11. The upper block 10, rectangular in shape, has a flat upper surface 12 which sealingly fits against the lower surface of a support plate 13 which is affixed to an ice cream or frozen dessert extruder machine of the nature described in the aforementioned U.S. Pat. 2,739,545, the machine not being illustrated. A relatively narrow and shallow cavity 14 extends partially across the upper face of the upper block 10 directly beneath and in communication with the outlet of one or more feed tubes 15 which connect to the pressurized source of frozen dessert mix, the feed tubes 15 extending through the support plate 13. Bolt holes 16 extending through the thickness of the upper block 10 are spaced about its periphery. A number of circular extrusion passages 17 having a wall 18 extend from the floor of the cavity 14 to the lower surface of the upper block segment 10.

The T-shaped lower block 11, with the outwardly extending flanges 19, has a flat upper face which sealingly fits against the lower face of the upper block 10, the lower block 11 having a line of extrusion passages 17a with walls 18a extending from the upper to the lower face of the lower block 11, each of which is in alignment with and a continuation of an extrusion passage 17 in the upper block 10 to form continuous passages extending from the cavity 14 of the upper block to the lower face of the lower block 11. The flanges 19 of the lower block 11 are pierced by bolt holes in alignment with the bolt holes 16 of the upper block 10, which in turn are in vertical alignment with similar bolt holes in the upper support plate 13, the upper and lower block segments 10 and 11 being fastened together and affixed to the support plate 13 by means of the bolts 20 passing through the respective bolt holes and secured by the nuts 21. The blocks 10 and 11 secured to the support plate 13 lie between the support plate 13 of the extruder machine and the cutting elements 23a and 23b that are movable toward and away from each other across the lower face 22 of the lower extruder block 11. Each cutting device comprises a cutting wire 24 supported by the cutting arm 25 which is in turn movably supported by support rods 26 of the cutting device which is supported from the extruder machine (not illustrated), the support arms 25 and cutting wires 24 being reciprocated by means of solenoids, or equivalent prime movers, which connect to and reciprocate the support rods 26.

One side of the upper block 10 is pierced by a series of bores 28 that extend from each extrusion passage 17 to the side face of the block 10 substantially perpendicularly to the longitudinal axis of the extrusion passages 17, the outer portion 28a of each bore being threaded. An elongated throttling stud 29, having an outer threaded portion 29a threadably engages the threaded portion 28a of the bore, is positioned within each bore 28 with the end portion 29b opposite the threaded end 29a in proximity to or extending into the extrusion passage 17. Each stud has an outer hexagonal head 29c for convenience in rotating the throttling studs to adjust them axially to the desired position in restricting the flow of frozen dessert through the passages 17, as will be subsequently described.

Although throttling studs 29 can be installed in all of the bores 28, a preferable embodiment is illustrated in FIGS. 3 and 4 in which a flat disc 30 is affixed to the end portion 29b' of the studs 29' that extend into the bores 28 aligned with the two extrusion passages 17' at the opposite extremities of the cavity 14 near the edge of the block 10. The flat discs 30 can be conveniently attached to the studs 29' by slotting the outer end portion 29b of the stud and providing a small slot in one edge of the disc 30 to provide a close friction fit when the two pieces are assembled in place by screwing the stud 29' into the bore with the disc 30 retained in the passage 17' in alignment with the end portion 29b of the stud. The degree to which the disc 30 blocks the passage 17' is obviously controllable by rotating the stud 29'.

Figure 2:
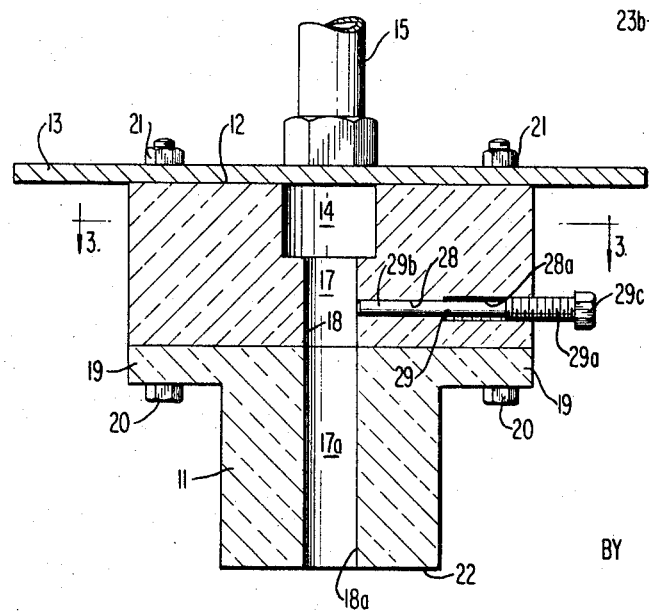
FIG. 2 is a sectional view taken along line 2—2 of FIG. 1.

In producing frozen dessert pellets, frozen dessert mix under pressure is fed through the inlet tube or tubes 15 into the cavity 14 of the extruder block and then the mix flows through the various extrusion passages 17 and 17a to emerge as a series of cylindrical lengths of mix depending vertically from the lower face 22 of the block. However, due to various factors, such as differences in frictional resistance of the passages, length of flow, temperature gradients, etc., the mix does not flow through the various passages at the same rate and the throttling studs 29 and 92a are used to establish an equal rate of flow through all extrusion passages 17 so that uniformly sized pellets will be produced each time the cutting wires 24 pass across the lower face of the extruder head. Adjustment of the throttling studs 29 to obtain the desired degree of throttling in each extrusion passage is accomplished by rotating each throttling stud 29 to extend the end portion 29b of the stud as far into the extrusion passage 17 as is necessary to obtain the desired restriction in a flow so that the flow from all extrusion passages is equalized. Maximum throttling is achieved when the end 29b of the stud extends completely across the passage 17 and minimum throttling is achieved when the studs are completely withdrawn from the passage, except for the modified throttling studs 29' that incorporate the discs 30, in which case maximum throttling is achieved by rotating the stud 29' to place the plane of the disc 30 perpendicular to the axis of the passage 17 and minimum throttling is achieved by rotating the throttling stud 29' ninety degrees so that the plane of the throttling disc 30 is parallel to the longitudinal axis of the extrusion passage 17'. Although plain throttling studs 29 of the type shown in FIG. 2 might be used to throttle the flow successfully in the end passage 17' when utilizing some types of mixes, it has been found necessary to utilize the modified type of throttling device incorporating the disc 30 to throttle the end passages 17' in most types of frozen dessert mixes. It is not inconceivable that in some situations, it might even be necessary to utilize the modified type of throttling device with the disc 30 attached to the stud 29' to adequately throttle the flow in the passages which are next to the outermost extrusion passages. It will be noted that the throttling or flow restricting devices are located in the upper block 10 and closer to the cavity 14 than the bottom face 22 of the lower block 11 so that the flow of mix is stabilized after leaving the area of restriction. This is necessary so that the mix flowing from the end of the passages will be coherent and retain its shape.

After various throttling studs are adjusted, as indicated above, to provide for the uniform flow from all of the passages, the machine is operated in the normal manner, i.e. the frozen dessert mix is fed to the extruder head under pressure and as the shaped masses of mix continuously emerge from the lower face of the lower extruder block 11, the cutting wires 24 of the two cutters are periodically moved together across the lower face of the extruder block 11 to pass through the shaped lengths of mix emerging from all of the extruder passages 17 and 17' to sever the individual pellets in one operation, the pellets falling upon trays of a conveyer passing beneath the extruder head and then into the freezing chamber where the pellets become congealed and hardened. FIG. 4 illustrates a hypothetical position to which the throttling studs might be positioned with the end studs 29' and discs 30 positioned to establish a maximum restriction in the flow of frozen dessert through the passages 17', and the next innermost throttling studs 29 being positioned to extend partially across the passages 17 and the innermost studs barely penetrating into the passage 17. Although these particular positions are not those usually assumed by the throttling device, they are representative of the relative degrees of restriction or throttling which is generally necessary, the outermost extrusion passage of the block required the highest degree of restriction and the innermost requiring the least degree of restriction.

Although the invention has been shown and described in a particular embodiment, other embodiments can be employed using the same concepts without departing from the spirit and scope of the invention. Modifications and adaptations of the present invention, which are readily apparent from the foregoing description and associated drawings, althuogh not specifically mentioned herein, will nevertheless be included within the scope of the present invention as indicated in the appended claims. For example, more or less than six extrusion passages can be used; extrusion passages can be disposed radially about and parallel to the central axis of the extruder head; and throttling of the individual passages can be accomplished by various other throttle configurations in locations in the extrusion passages; as well as various sizes and shapes of extrusion passages and cross-sections can be used to achieve the desired output as contemplated in the present invention.

What is claimed is:

1. In an apparatus having a downwardly facing extruder nozzle means from which a frozen dessert mix is continuously extruded and the slices of the mix periodically severed by cutting means passing across the lower face of said nozzle means, an improved extruder head for producing batches of frozen dessert pellets comprising a manifold cavity within said head communicating with a source of congealable dessert mix under pressure, a plurality of at least several passages extending vertically downwardly from said cavity toward the cutting means which is movable transversely across the lower end of said passages, and an adjustable throttling means for each said passage for controllably varying the cross-sectional area of each said passage at a point intermediate its length.

2. The improved extruder head described in claim 1 wherein at least some of said throttling means includes a stud having a diameter less than said passage and means for projecting an end portion of said stud a selected distance transversely of one of said passages.

3. The improved extruder head described in claim 2 wherein said stud has a screw threaded portion engageably fitting within the threaded fitting on said head, whereby rotation of said stud within said fitting longitudinally moves said stud transversely of said passage.

4. The improved extruder head described in claim 2 wherein said passages are arranged transversely across said head and at least the outermost passages each have a throttling means comprising a flat disc of a lesser area and diagonal dimensions than the cross-sectional dimensions of said passage and means mounting said disc within said passage for movement between a position in which the plane of the disc is perpendicular to the axis of said passage and a position in which the plane of the disc is parallel to the axis of said passage.

5. The improved extruder head described in claim 2 wherein said throttling means are located closer to the end of said passage terminating at said cavity.

6. A pellet producing extruder head for a frozen dessert extrusion apparatus in which a source of congealable frozen dessert communicates with an extruder having a downwardly facing nozzle located immediately above a cutter movable periodically across the nozzle outlet for severing slabs from the emerging frozen dessert mix that fall onto a conveyer movable through a freezing chamber in which the severed mix is congealed, said head comprising a block having an upper, side and bottom surfaces of which the upper surface sealingly fits against an outlet from the source of frozen dessert mix, the upper portions of said block containing a shallow cavity extending partially across the block and in communication with the dessert mix outlet, means for attaching said block to the dessert mix outlet positioning the lower surface of said block above the cutter moving transversely thereacross, said block having a plurality of at least several open passages extending from the lower floor of said cavity to said block lower surface, a restrictor mounted within said block at each said passages intermediate its ends for movement across said passage to block the passage in various degrees commensurate with the restrictor position, and means for moving and positioning each said restrictor to effect a predetermined degree of blockage of each said passage.

7. The extruder head described in claim 6 wherein at least some of said restrictors are elongated studs each mounted within said block for movement along its longitudinal axis positioned transversely of and in communicating alignment with one of said passages and means for controllably moving each said stud axially to a predetermined position relative to said one passage.

8. The extruder head described in claim 7 wherein each said stud is contained within a bore extending from said passage to a side surface of said block with at least a portion of said bore having screw threads and at least a portion of said stud having screw threads engaging the threads of said bore, whereby rotation of said stud moves it axially to position the inner end portion of the stud at a predetermined position within said passage.

9. The extruder head described in claim 7 wherein said passages are arranged in a line along the length of said cavity, the restrictors for at least the outermost passages at either end of said line comprise a flat disc mounted within said passage for rotation about a diametrical axis positioned transversely of said passage, and means for rotating said disc between a position in which the plane of the disc is perpendicular to the axis of said passage and a position in which the plane of the disc is parallel to the axis of said passage, and the restrictors in the passage of said line within the outermost passages that contain said disc restrictors comprise said elongated studs and means for axial movement to a predetermined position relative to their respective passages.

10. The extruder head described in claim 9 wherein each said stud is contained within a bore extending from said passage to a side surface of said block with at least a portion of said bore having screw threads, at least a portion of said stud has screw threads engaging the threads of said bore, whereby rotation of said stud moves it axially to position the inner end portion a predetermined distance into said passage, and each said disc restrictor is affixed to the end of a stud with the longitudinal axis of said stud being in the plane of said disc, said stud being contained within a bore extending from a respective passage to a side surface of said block, at least a portion of said bore having screw threads, and said stud having screw threads engaging the threads of said bore for rotatingly retaining said stud in the block.

References Cited
UNITED STATES PATENTS 3,307,499   3/1967   Bergstrom _____ 107—14X
3,481,282   12/1969  Reynolds _____ 107—14X WALTER A. SCHEEL, Primary Examiner A. O. HENDERSON, Assistant Examiner U.S. Cl. X.R.
107—54, 68